Dec. 24, 1929.  O. A. E. HOYER  1,740,597
GEOMETRICAL INSTRUMENT
Filed Feb. 23, 1926  5 Sheets-Sheet 1
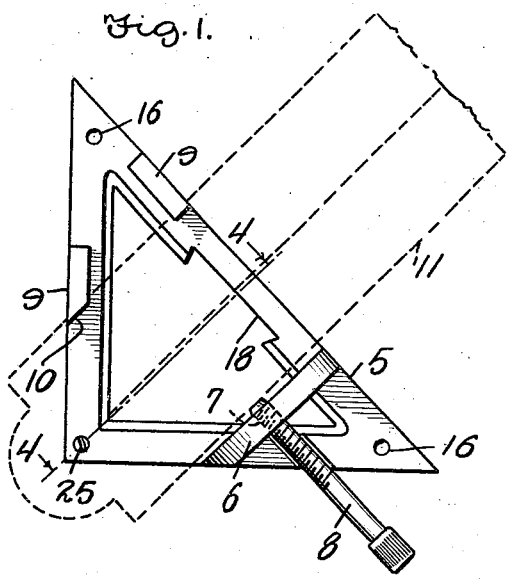
Fig. 1.
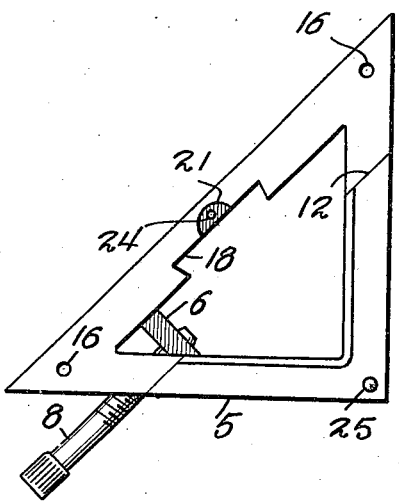
Fig. 2.
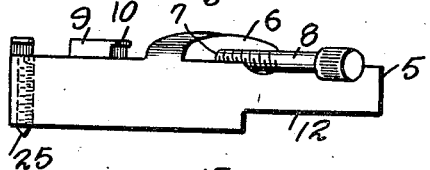
Fig. 3.
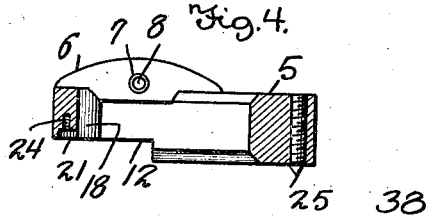
Fig. 4.
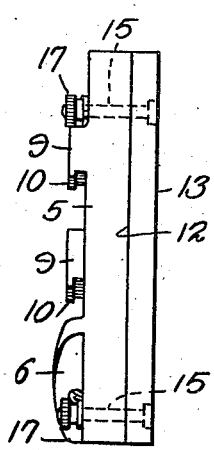
Fig. 6.
Fig. 5.
Otto A. E. Hoyer, INVENTOR.
Witnesses
BY Richard B. Owen
ATTORNEY.

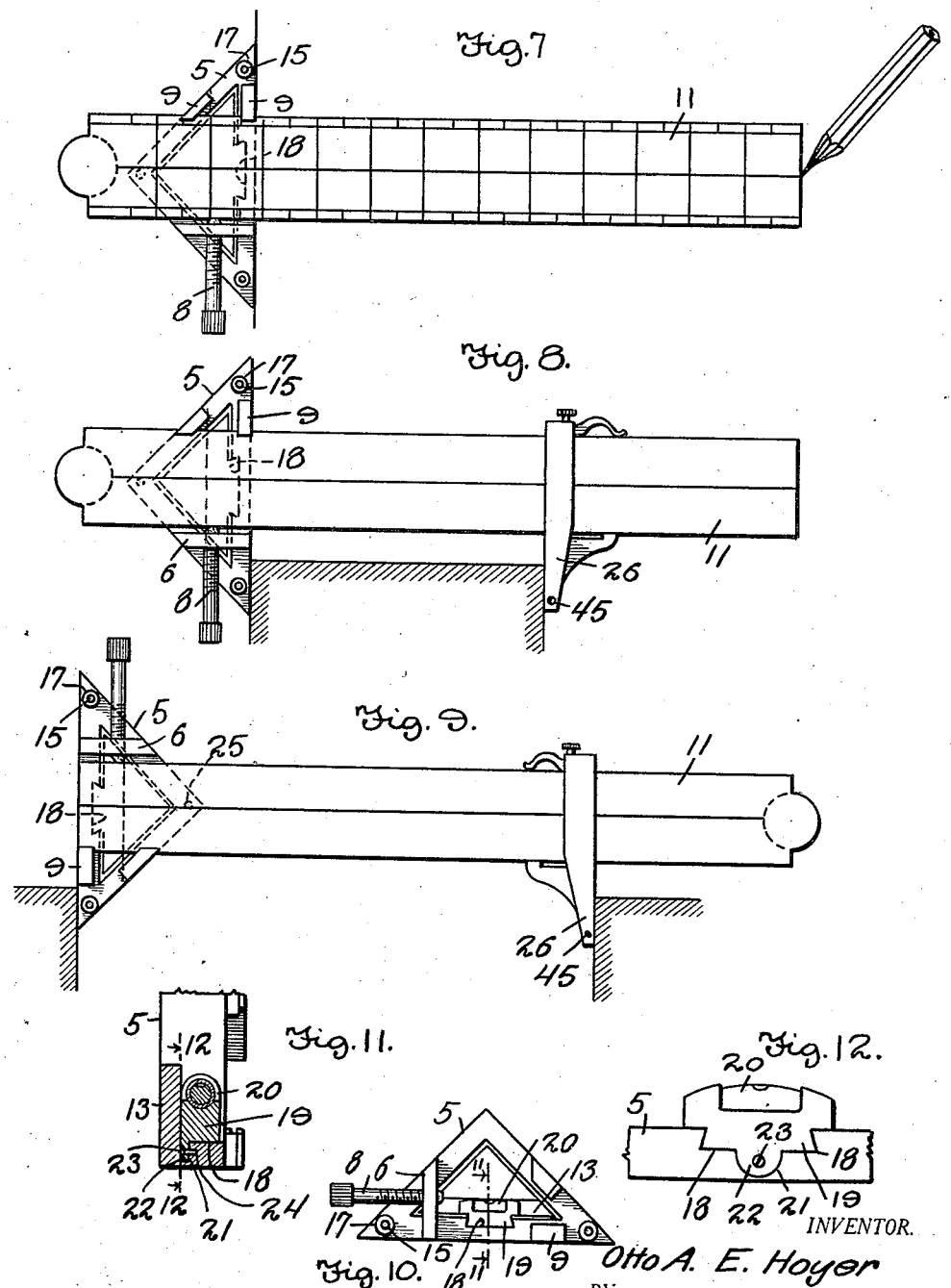

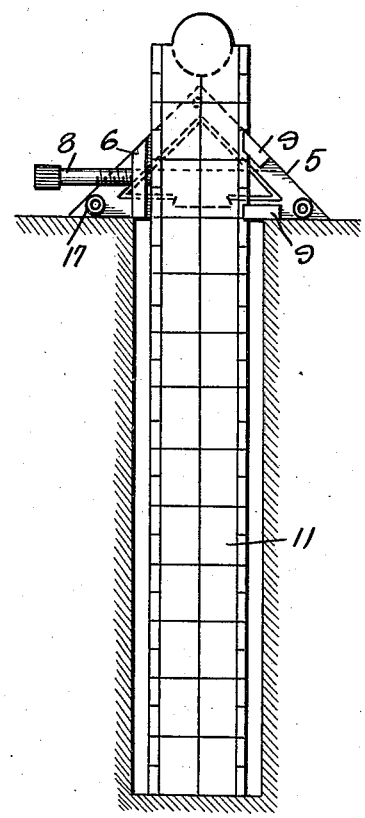
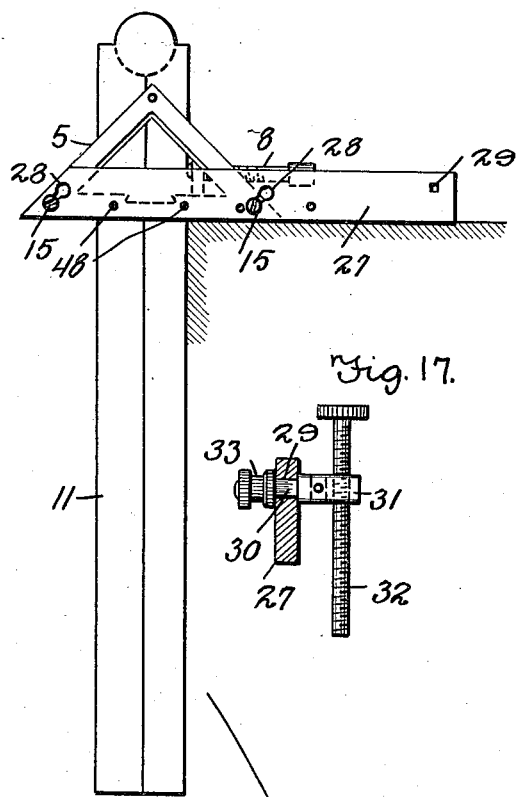
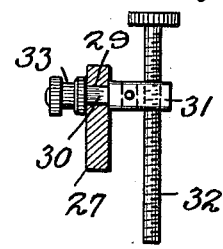
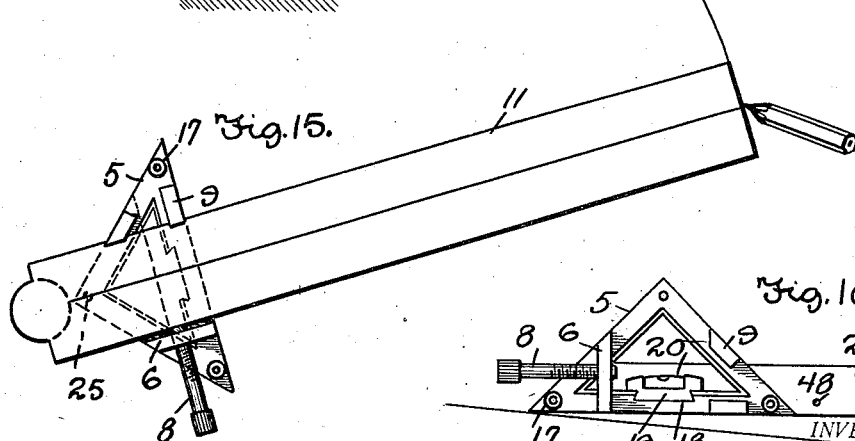
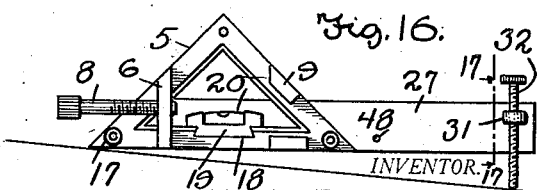

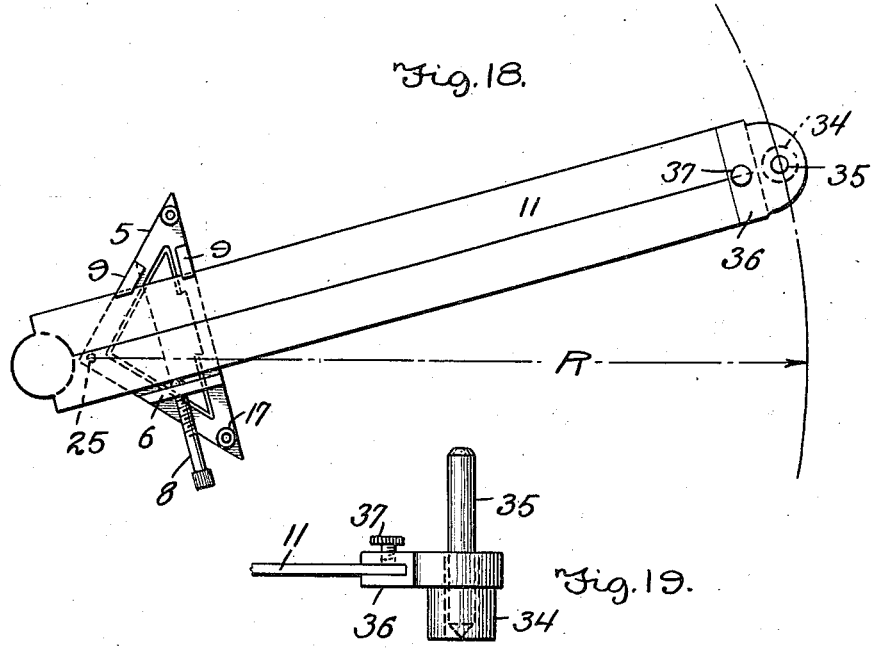
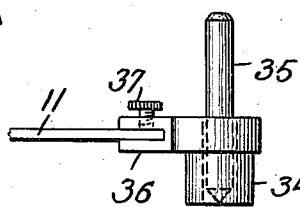
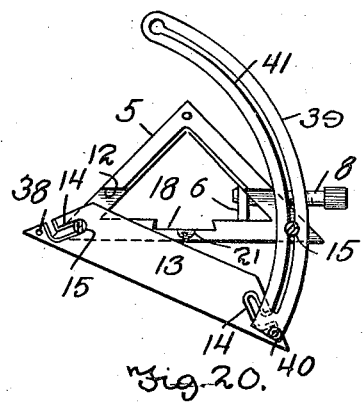
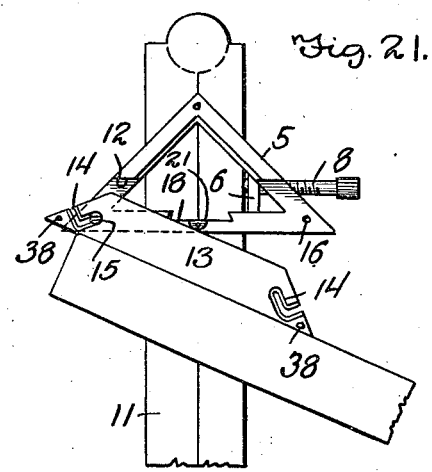

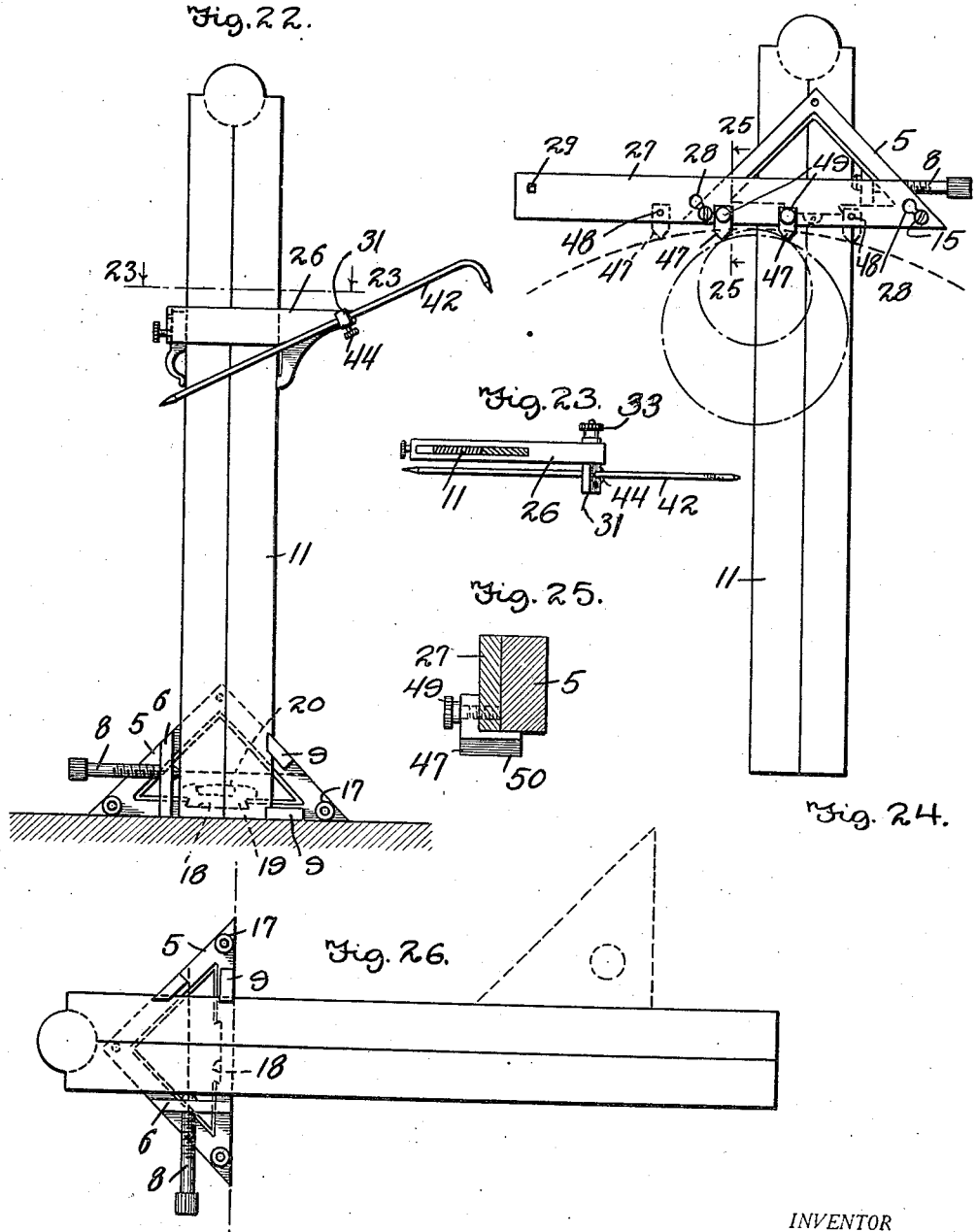

Patented Dec. 24, 1929

1,740,597

UNITED STATES PATENT OFFICE

OTTO A. E. HOYER, OF PLAISTOW, LONDON, ENGLAND

GEOMETRICAL INSTRUMENT

Application filed February 23, 1926. Serial No. 90,114.

This invention relates to certain new and useful improvements in geometrical instruments, and has more particular reference to a combination tool of this kind particularly serviceable to pattern makers and plant erecting engineers, although capable of general use, to advantage by various tradesmen, such as carpenters, draftsmen and the like.

The primary object of the invention is to provide a geometrical instrument which is simple and durable in construction as well as efficient in use.

A further important object is to provide a geometrical instrument which, by slight rearrangement and combinations of parts, can be expeditiously varied for performing numerous kinds of work.

The invention embraces the provision of a main instrument member in the form of a right angle triangle capable of use as a square and as a miter gage or 45° set square, and a further object is to provide such main member with means for readily adjustably and attachably associating a ruler therewith so as to enable the device, with additional devices or attachments for the ruler when necessary, to be employed as a distance gage, outside and inside calipers, a depth gage, a try-square, a compass, a circular center punch, a bevel, a surface gage, a center square or a T-square.

A further object of the invention is to provide the main instrument member or right angle triangle in the form of an open frame with means for mounting a spirit level tube or glass in the same upon the base thereof whereby the device may be utilized as a level independently of attachments, or whereby the same may be accurately set in a level position when the triangle acts as a supporting base for a surface gage.

A further object is to provide the base of the triangle with a detachable and swinging blade at one side for enabling use of the tool as a bevel or a bevel protractor, the blade being positionable when folded or not in use so as to provide the triangle with a flat surface at one side or the side opposite that to which the ruler is adapted to be attached, whereby proper use can be made of the triangle in the various instances where the triangle is laid flatly upon a supporting surface.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 1 is a side elevational view of the main instrument member or right angle triangle forming part of the present invention;

Figure 2 is a view of the device shown in Figure 1 looking at the opposite side thereof and with the bevel blade removed;

Figure 3 is an edge elevational view looking in an upward direction at the device shown in Figure 1;

Figure 4 is a central longitudinal section taken upon line 4—4 of Figure 1;

Figure 5 is a view similar to Figure 2 with the ruler clamping screw removed and the bevel blade attached;

Figure 6 is an edge elevation looking toward the right of Figure 5;

Figure 7 shows the device of Figure 1 on a smaller scale and operatively associated with a ruler to illustrate the use of the invention as a distance gage;

Figure 8 is a view similar to Figure 7 with an attachment on the ruler for adapting the device for use as outside calipers;

Figure 9 is a view similar to Figure 8 with the triangle and ruler attachment reversed to illustrate use of the device as inside calipers;

Figure 10 is a side elevational view of the triangle shown in Figures 1 to 6 inclusive with a bubble tube or glass mounted therein for adapting the device to be employed as an ordinary spirit level;

Figure 11 is a fragmentary section taken upon the line 11—11 of Figure 10 and shown on a larger scale;

Figure 12 is a fragmentary section taken substantially upon line 12—12 of Figure 11;

Figure 13 illustrates the manner of using the device shown in Figure 7 as a depth gage;

Figure 14 is an elevational view similar to Figure 7 with a base extension blade attached to the triangle in lieu of the bevel blade for adapting the device for use a try-square;

Figure 15 is a view illustrating the use of the device as shown in Figures 7 and 13 as a compass;

Figure 16 illustrates the device of Figure 10 as equipped with the base extension blade of Figure 14 and with the outer end of said base extension blade provided with an adjusting screw for adapting the device for use as a level in determining the inclination of a surface;

Figure 17 is an enlarged transverse section taken upon line 17—17 of Figure 16;

Figure 18 illustrates the device of Figure 15 with an attachment on the outer end of the ruler for adapting the instrument for use as a circular center punch;

Figure 19 is a fragmentary elevational view showing the outer end of the ruler and its attachment of Figure 18;

Figure 20 illustrates the device of Figures 5 and 6 with the bevel blade swung at an angle to the base of the triangle member and having an adjusting segment associated with the same and the triangle for adapting the device for use as a bevel protractor;

Figure 21 is a view similar to Figure 20 with the adjusting segment removed and the ruler associated with the triangle for adapting the device for use as an ordinary bevel;

Figure 22 illustrates the ruler engaged with the triangle as in Figure 9 and with a contact attachment on the ruler so as to adapt the instrument for use as a surface gage with the triangle constituting a supporting base;

Figure 23 is a horizontal section taken upon line 23—23 of Figure 22;

Figure 24 is an elevational view of the device shown in Figure 14 with contacts attached to the lower edge of the base extension blades for adapting the device for use as a center square;

Figure 25 is a transverse section taken upon line 25—25 of Figure 24; and

Figure 26 is a view similar to Figures 7 and 15 illustrating the manner of using the device of said figures as a T-square.

Referring more in detail to the drawings, the present invention embodies a main member or right angle triangle 5 preferably in the form of an open frame or casting embodying a base member and side members of uniform width as shown, and adapted for use as a square and as a miter gage or 45° set square in an obvious manner. These uses of the triangle are made possible by reason of the fact that the side members thereof are at right angles to each other, while said side members are at 45° angles to the base member of the triangle. As shown clearly in Figures 1 to 4 inclusive and 6, the triangle 5 is provided upon one side thereof with a lateral flange 6 which is disposed parallel to and at one side of a line perpendicular to the base and intersecting the apex of the triangle and formed with a central transverse opening 7 for adjustable reception of a set screw 8. Upon the same side of the triangle and respectively provided upon the base member and the adjacent side member of the triangle at the opposite side of a line perpendicular to the base and intersecting the apex of said triangle are a pair of lateral lugs 9 which have overhanging lips 10 upon their inner ends and which cooperate with the flange 6 to form a guide way for removable and slidable reception of the end of a ruler 11. As indicated clearly by dotted lines in Figure 1, a longitudinal edge portion of the ruler is adapted to be engaged under the lips 10 of the lugs 9, and the set screw 8 is adapted to be threaded inwardly into engagement with the other longitudinal edge of the ruler so as to rigidly secure the latter to the adjacent side of the triangle and to effectively maintain the ruler in any desired adjusted position to which it may be slid relative to the triangle. In this way the ruler is adjusted in a direction parallel with a line perpendicular to the base and intersecting the apex of the triangle and relative to the latter, and the ruler may be attached so as to project beyond the base edge of the triangle perpendicularly to the base edge of the same, whereby the ruler and triangle may cooperate for various uses as illustrated in Figures 7 to 9 inclusive, 13, 14, 21, 23, 24 and 26.

The other side of the triangle is formed with a recess or rabbet 12 parallel with the base member of the triangle by forming the base member and the adjacent end portions of the side members of the triangle of lesser thickness than the remaining portions of said side members of the triangle as clearly shown in Figures 2 to 4 inclusive, and removably secured in this recess or rabbet 12 is a bevel blade 13 which, when in inoperative or folded position as illustrated in Figures 5 and 6, has its oppositely beveled end edges flush with the outer edges of the side members of the triangle and its outer surface flush with the adjacent side surfaces of the thicker portions of said side members of the triangle. In this way, this side of the triangle is provided with a flat surface adapted to properly flatly engage a flat supporting surface in certain uses of the instrument hereinafter pointed out. It is further noted that the bevel blade 13 is of greater width than the base member of the triangle so as to project inwardly beyond the inner edge of said base member of the triangle for a purpose which will later be described. In order to attach the bevel blade 13 to the triangle so that the same may be swung from either end thereof relative to the triangle and yet effectively secured at both ends to the triangle when not in use, the ends of the bevel blade 13 are formed with angular slots 14, the outer portions of which open through the ends of the blade 13, and the inner portions of which are parallel with the beveled ends of the blade as shown clearly in Figure 5, and clamping screws are passed through these slots as at 15 and also through transverse apertures or openings 16 provided in the triangle at the junctures of the side members of the triangle with the ends of the base member of the triangle. The clamping screws 15 have knurled nuts 17 threaded upon the stems thereof adapted to be tightened for effectively securing the bevel blade in folded position, and it is noted that by loosening both nuts 17, the bevel blade may be slid in a direction parallel with the longitudinal axis of either side member of the triangle so as to disengage one end of the bevel blade from one of the clamping screws whereby the bevel blade may be swung outwardly at an angle to the base member of the triangle for use in bevelling operations as illustrated in Figures 20 and 21, the blade 13 being maintained in its outwardly swung or adjusted position by tightening the nut on the clamping screw 15 with which the bevel blade is still engaged.

The base member of the triangle 5 is provided in its upper edge and intermediate the ends thereof with a transverse undercut or dove-tailed groove 18 adapted for snug lateral sliding reception of the similarly shaped base 19 of a suitable holder which carries a bubble tube or glass 20 as commonly employed in spirit levels. As clearly shown in Figures 2 to 4 and 10 to 12 inclusive, when the base 19 of the level tube is engaged in the recess 18, said tube is properly exposed within the lower portion of the triangle opening parallel with the base edge of the triangle and at the inner side of the projecting portion of the bevel blade 13 so that the latter forms a background to facilitate accurately determining the position of the bubble in the level glass or tube. The rabbeted side of the triangle is provided with a recess 21 intermediate the ends of the groove 18 adapted for snug reception of a depending ear 22 rigid with and depending from one side of the base 19, and a set screw 23 is passed through this ear 22 and threaded into a socket 24 provided centrally of the recess 21 so as to rigidly attach the bevel tube holder to the triangle. It is noted that the intermediate portion of the blade 13 will be disposed against the outer surface of the ear 22 and the level tube holder is thus effectively prevented from lateral displacement relative to the triangle while the undercut form of the groove 18 and the similar form of the base 19 fitted therein will effectively prevent displacement of the level tube holder from the triangle. Thus, a durable and effective attachment is provided although embodying extreme simplicity of construction.

With the ruler attached to the triangle as indicated in Figure 1 and completely illustrated in Figure 7, so that the ruler projects toward and past the base edge of the triangle, the instrument may be utilized as a distance gage as clearly illustrated in Figure 7 and as will be clearly understood by those skilled in the art. The triangle is provided at its apex with a transverse threaded opening in which is removably secured a contact member or point 25. This contact member consists of a threaded shank detachably engaged in the opening of the triangle and having a pointed end projecting beyond one side of the triangle for engagement with a surface whereby the device may be utilized as a compass as illustrated in Figure 15. The device employed as in Figure 15 makes the use of the triangle and ruler the same as is the case in Figure 7, and additionally incurs employment of the contact 25 as indicated in Figure 15, the device being swung about the pivot furnished by the contact or center pin 25 while a pencil is held against the end of the ruler as shown.

The device in Figure 7 may be employed as outside calipers by simply adding an adjustable sliding contact or jaw 26, said jaw being slidably mounted upon the ruler and cooperating with the portion of the triangle projecting to one side of the ruler for furnishing the required contacts engageable with the surfaces of the work. By reversing the triangle and jaw 26 as shown in Figure 8 so that the same are positioned as illustrated in Figure 9, the instrument may be employed as inside calipers, such reversing of these elements presenting their contacting surfaces outwardly as is necessary. In this use illustrated in Figure 9, the ruler projects away from the base edge of the triangle and toward and past the apex of the triangle as is clearly shown.

The exact organization illustrated in Figure 7 may be employed as a depth gage as clearly illustrated in Figure 13, the base edge of the triangle resting against the surface of the work in this use with the ruler projecting into the bore or cavity, the depth of which is to be determined.

To adapt the device of Figures 7 and 13 for effective use as a try-square, a base extension blade 27 is attached to the triangle in place of the bevel blade 13 so that an end portion of the blade 27 is fitted in the rabbet 12 and maintained therein by means of the clamping screws 15, while the remaining end portion of the blade 27 projects beyond one end of the triangle as clearly shown in Figure 14. The projecting part of the blade 27 and the outer edge of the triangle at the same side of the ruler thus presents a relatively long bearing surface or edge engageable with the work and disposed at right angles to the adjacent longitudinal edge of the ruler. The attached end portion of the blade 27 is provided with a pair of key-hole slots 28 disposed parallel with the longitudinal axis of one of the side members of the triangle whereby the blade 27 may be attached or removed without necessitating removal of the nuts 17 or the clamping screws 15. In other words, the enlarged ends of the key-hole slots 28 are of a size to permit the heads of the screws 15 to pass therethrough so that the blade 27 may be positioned in contact with the adjacent side of the triangle and then slid inwardly for bringing the restricted portions of the slots 28 under the heads of the screws so that when the latter are tightened the blade is effectively held in place. Obviously, by reversing this operation or loosening the nuts 17 and then sliding the blade 27 outwardly until the large inner end portions of the slot 28 register with the heads of the screws 15, the blade 27 may be readily removed by causing the screw heads to pass through the larger end portions of the slots 28.

As shown clearly in Figures 14, 16 and 17, the outer or projecting end of the base extension blade 27 is provided with a transverse opening 29 of polygonal form adapted for snug reception of a similarly shaped stem 30 upon one end of which is provided a rigid ear 31 through which is threaded a vertical adjusting screw 32. The other end of the stem 30 is formed with a threaded extension upon which is adjustably disposed a clamping nut 33 by means of which the stem is securely fastened to the blade 27 with the ear 31 properly disposed so that the screw 32 is positioned transversely of the blade 27 or at right angles to the longitudinal axis of the latter. The screw 32 is of a length considerably greater than the width of the blade 27 so that the same may be adjusted to have its lower end portion project below the lower edge of the blade 27 for engagement or contact with a surface which is inclined as illustrated in Figure 16. In this latter figure the device of Figure 14 is shown with the ruler removed and the level tube holder in place on the triangle so that when the lower edge of the blade 27 and the triangle are level, this fact will be indicated by the level tube bubble, whereupon the degree of inclination of the surface can be readily ascertained.

The device of Figure 15 may be employed as a circular center punch by providing the outer end of the ruler 11 with an attachment as shown in Figures 18 and 19. As shown in these figures, this attachment embodies a tubular guide 34 for a sliding punch pin 35 whose upper end is adapted to project beyond the upper end of the guide 34 and receive the impact of a blow whereby the pointed lower end of the pin 35 may make the desired punch mark upon the work. The punch pin guide 34 is provided at its upper end with a lateral socket 36 of proper form for snug reception of the end of the ruler 11, and the latter is effectively held in the socket by means of a set screw provided on the latter in position to have its inner end brought into tight contact withe upper surface of the ruler as shown. By loosening the screw 37 the attachment may be readily removed as is obvious, and it is of course understood that in this use of the invention the center point 25 is utilized in connection with the triangle 5 which carries the ruler. It might be noted that in certain uses of the device the ruler may be regarded simply as a bar whether provided with graduations or not, although I have found it particularly expedient to employ an ordinary folding ruler in folded condition with the triangle so that the proper graduations are presented in other uses of the device which require the same.

As shown clearly in Figures 5 and 20, the ends of the bevel blade 13 are formed with transverse openings 38 so as to permit the pivotal attachment of an end portion of a slotted adjusting segment 39 to either end thereof by means of a pivot pin or screw as indicated at 40. When this slotted adjusting segment is employed for providing a bevel protractor as shown in Figure 20, the clamping screw 15 from which one end of the bevel plate 13 has been disengaged, slidably projects through the longitudinal slot 41 of the segment 39 with the head of such clamping screw engaged against the outer surface of the segment at opposite sides of said slot. In this way, the nut 17 on the adjusting screw engaged in the slot 41 can be tightened for securing the adjusting segment 39 in any desired longitudinally adjusted position for maintaining the bevel blade 13 at the required angle to the triangle 5, suitable graduations being provided on a side of the segment 39 for indicating purposes if desired. For ordinary bevelling operations the triangle 5 with its attached bevel blade 13 may be employed with the ruler 11 and without the segment 39 as illustrated in Figure 21, the ruler being attached to the triangle in the same manner as practiced in uses of the invention hereinbefore pointed out.

As shown in Figure 22, the inside calipers of Figure 9 may be employed as a surface gage by equipping the slidable jaw or contact member 26 with a conventional form of contact rod 42 of a well known type employed in many conventional forms of surface gages of the well known single or offset contact type. As shown, the rod 42 is adjustably slidable through the eye 31 which is equipped with a set screw 44 and provided with a stem swiveled in a transverse opening 45 provided in the outer end of the jaw 26. The stem of the eye 43 has a clamping nut thereon as at 33 adapted to be tightened to secure the eye 31 in any rotarily adjusted position for an obvious purpose. In this use of the invention the triangle 5 is employed with the level glass holder attached as illustrated in Figure 10 and with an end edge of the ruler flush with the outer edge of the base member of the triangle so that the latter forms a supporting base for the surface gage and the level facilitates positioning of the triangle in a level position.

By equipping the lower edge portion of the base extension blade 27 of the triangle 5 with a plurality of contacts 47, the device may be employed as a center square as clearly illustrated in Figures 24 and 25. For this purpose the blade 27 is provided with a plurality of pairs of transverse openings adjacent its lower longitudinal edge as indicated at 48 for threaded reception of attaching screws 49 which pass through the contacts 47 to secure them against the outer side of the blade 27. The openings 48 of each pair are located at equal distances to each side of a longitudinal edge of the bar or ruler 11 so that said edge of the latter will define a center line of a circle when the pair of contacts are engaged with the surface thereof as indicated in Figure 24. Obviously, the contacts are employed with only one pair of openings of the blade 27 at a time, the contacts 47 being located closer together when the work is of small diameter as shown, and being employed in connection with the widely separated pair of openings 48 when the diameter is comparatively large as indicated by dotted lines in Figure 24. In order to facilitate attachment of the contacts 47 and effectively prevent lateral swinging thereof upon the attaching screws 49, the lower contacting ends thereof are provided with lateral extensions 50 adapted to form relatively long bearing edges for engagement with the work and to flatly engage the under surfaces or edges of the blade 27 and the base member of the triangle 5 as shown in Figure 25.

As the ruler is secured against one side of the triangle 5, the base edge of the latter may be engaged with a drawing board and the device of Figures 7 or 13 employed as a T-square as illustrated in Figure 26.

The various uses of the invention are so well known to those skilled in the art that it is deemed unnecessary to deal with the individual uses in more specific detail, and from the foregoing description it is believed that the construction and the manner of use as well as the advantages of the invention in all instances, will be readily understood and appreciated.

Minor changes may be made without departing from the spirit and scope of the invention as claimed.

What I claim as new is:—

In a geometrical instrument, a right angle triangle having means to adjustably slidably attach a straight edge to one side thereof with the longitudinal axis of the straight edge coincident with a line perpendicular to the base and intersecting the apex of the triangle, said triangle having a rabbet in the opposite side thereof along its base, a base extension blade of the triangle having an end portion thereof fitted in the rabbet of the latter, means to removably secure the end of the base extension blade in the rabbet of the triangle, a pair of contacts, and means to secure the contacts to the lower edge portion of the base extension blade at desired different distances to opposite sides of a longitudinal edge of the straight edge.

In testimony whereof I affix my signature.

OTTO A. E. HOYER.